US011409489B1

(12) United States Patent
Borunda et al.

(10) Patent No.: US 11,409,489 B1
(45) Date of Patent: *Aug. 9, 2022

(54) CONTEXT MANAGEMENT FOR MULTIPLE DEVICES

(71) Applicant: United Services Automobile Association (USAA), San Antonio, TX (US)

(72) Inventors: Adrian Borunda, Celina, TX (US); Brandon Scott Kotara, San Antonio, TX (US); Richard Tanner, McKinney, TX (US); Ben Hawkins, Plano, TX (US); Quincy Nanaasare Obeng, Plano, TX (US); Cale Riley Spratt, Plano, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/151,072

(22) Filed: Jan. 15, 2021

Related U.S. Application Data

(63) Continuation of application No. 16/000,752, filed on Jun. 5, 2018, now Pat. No. 10,929,081.

(60) Provisional application No. 62/515,977, filed on Jun. 6, 2017.

(51) Int. Cl.
*G06F 3/14* (2006.01)

(52) U.S. Cl.
CPC ....... *G06F 3/1423* (2013.01); *G09G 2354/00* (2013.01); *G09G 2370/20* (2013.01)

(58) Field of Classification Search
CPC .............. G06F 3/1423; G09G 2354/00; G09G 2370/20; H04L 67/18; H04L 67/22
See application file for complete search history.

(56) References Cited

U.S. PATENT DOCUMENTS

| 7,233,786 B1* | 6/2007 | Harris | H04L 29/06047 455/412.2 |
| 9,432,472 B2* | 8/2016 | Burger | G06F 21/123 |
| 9,515,967 B2* | 12/2016 | Wang | H04L 51/04 |

(Continued)

OTHER PUBLICATIONS

U.S. Appl. No. 16/000,752, filed Jun. 5, 2018, Context Management for Multiple Devices.

(Continued)

*Primary Examiner* — Daeho D Song
(74) *Attorney, Agent, or Firm* — Perkins Coie LLP

(57) ABSTRACT

The present technology provides a system that enables a user to communicate with one of multiple devices in a network based on context information from another device in the network. The system includes a context manager configured to (1) receive context information from the multiple devices; (2) identify a subject-of-interest based on a user input; (3) determine a set of relevant context information based on the subject-of-interest and the received context information; and (4) transmitting the set of relevant context information to a target device to perform a task associated with the subject-of-interest. The context information managed by the present technology enables a user to conveniently interact with the multiple devices in the network without requiring the user to provide details of his/her instructions.

20 Claims, 5 Drawing Sheets

(56) References Cited

U.S. PATENT DOCUMENTS

| | | | | |
|---|---|---|---|---|
| 9,578,512 B1* | 2/2017 | Avegliano | | H04W 12/02 |
| 9,811,312 B2* | 11/2017 | Bjorkengren | | G06F 3/167 |
| 10,007,725 B2* | 6/2018 | Mayo | | G06F 16/9535 |
| 10,056,079 B2* | 8/2018 | Matsumoto | | G10L 15/22 |
| 10,929,081 B1* | 2/2021 | Borunda | | G06F 3/1423 |
| 10,970,352 B1* | 4/2021 | Lewis | | G06F 16/9537 |
| 11,269,487 B2* | 3/2022 | Lim | | G06F 16/9535 |
| 2004/0002866 A1* | 1/2004 | Deisher | | G10L 15/30 |
| | | | | 704/E15.047 |
| 2004/0143669 A1* | 7/2004 | Zhao | | H04L 67/2823 |
| | | | | 709/228 |
| 2005/0021866 A1* | 1/2005 | Kang | | H04L 69/329 |
| | | | | 709/248 |
| 2006/0075095 A1* | 4/2006 | Horio | | H04L 47/806 |
| | | | | 709/224 |
| 2008/0005679 A1* | 1/2008 | Rimas-Ribikauskas | | |
| | | | | H04W 4/50 |
| | | | | 715/745 |
| 2008/0104690 A1* | 5/2008 | Hirai | | H04W 12/06 |
| | | | | 726/14 |
| 2008/0162666 A1* | 7/2008 | Ebihara | | H04L 69/40 |
| | | | | 709/217 |
| 2011/0128183 A1* | 6/2011 | Marshall | | G01S 5/0252 |
| | | | | 342/357.29 |
| 2011/0145847 A1* | 6/2011 | Barve | | H04H 60/64 |
| | | | | 725/9 |
| 2011/0171931 A1* | 7/2011 | Kortesniemi | | H04L 12/14 |
| | | | | 455/407 |
| 2012/0036261 A1* | 2/2012 | Salazar | | H04L 67/306 |
| | | | | 709/225 |
| 2012/0092235 A1* | 4/2012 | Ham | | G06F 3/1423 |
| | | | | 345/1.3 |
| 2012/0246293 A1* | 9/2012 | De Jager | | G06F 21/552 |
| | | | | 709/224 |
| 2012/0254348 A1* | 10/2012 | Chaturvedi | | H04L 67/10 |
| | | | | 709/217 |
| 2013/0024901 A1* | 1/2013 | Sharif-Ahmadi | | H04L 67/28 |
| | | | | 725/114 |
| 2013/0166684 A1* | 6/2013 | Park | | H04L 65/4069 |
| | | | | 709/217 |
| 2013/0167215 A1* | 6/2013 | Yang | | G06F 21/35 |
| | | | | 726/7 |
| 2013/0346396 A1* | 12/2013 | Stamm | | G06F 16/9535 |
| | | | | 707/722 |
| 2014/0053228 A1* | 2/2014 | Mahadevan | | G06F 16/176 |
| | | | | 726/1 |
| 2014/0164400 A1* | 6/2014 | Kruglick | | H04L 41/0266 |
| | | | | 707/749 |
| 2014/0173446 A1* | 6/2014 | Lee | | H04N 21/4131 |
| | | | | 715/736 |
| 2014/0192967 A1* | 7/2014 | Christophe | | H04M 3/533 |
| | | | | 379/88.11 |
| 2014/0223548 A1* | 8/2014 | Wassingbo | | H04N 21/25875 |
| | | | | 726/19 |
| 2014/0258587 A1* | 9/2014 | Baryudin | | G06F 12/0246 |
| | | | | 711/102 |
| 2014/0279893 A1* | 9/2014 | Branton | | G06F 16/904 |
| | | | | 707/634 |
| 2014/0365901 A1* | 12/2014 | Moha | | G01C 21/367 |
| | | | | 715/738 |
| 2015/0095366 A1* | 4/2015 | Mo | | H04N 21/25891 |
| | | | | 707/769 |
| 2015/0134459 A1* | 5/2015 | Dipaola | | G06Q 30/0261 |
| | | | | 705/14.64 |
| 2015/0213127 A1* | 7/2015 | Chang | | G06F 16/9038 |
| | | | | 707/722 |
| 2015/0245216 A1* | 8/2015 | Cohen | | H04L 67/306 |
| | | | | 455/410 |
| 2015/0281891 A1* | 10/2015 | Umetani | | H04W 4/025 |
| | | | | 455/456.1 |
| 2015/0302096 A1* | 10/2015 | Iwasaki | | G06F 16/90332 |
| | | | | 707/722 |
| 2015/0347010 A1* | 12/2015 | Yang | | G06F 3/0482 |
| | | | | 715/765 |
| 2015/0347461 A1* | 12/2015 | Moon | | G06F 16/532 |
| | | | | 707/722 |
| 2016/0005068 A1* | 1/2016 | Im | | H04B 5/0037 |
| | | | | 705/14.37 |
| 2016/0014166 A1* | 1/2016 | Warrick | | H04L 65/4084 |
| | | | | 370/254 |
| 2016/0034514 A1* | 2/2016 | Singhal | | G06F 16/9535 |
| | | | | 707/706 |
| 2016/0062726 A1* | 3/2016 | Takamura | | G06F 3/1454 |
| | | | | 345/2.2 |
| 2016/0077794 A1* | 3/2016 | Kim | | G10L 15/20 |
| | | | | 704/275 |
| 2016/0119418 A1* | 4/2016 | Cho | | H04L 65/4084 |
| | | | | 709/217 |
| 2016/0156392 A1* | 6/2016 | Jung | | H04W 72/048 |
| | | | | 370/338 |
| 2016/0170710 A1* | 6/2016 | Kim | | G06F 3/167 |
| | | | | 704/275 |
| 2016/0189717 A1* | 6/2016 | Kannan | | G10L 15/26 |
| | | | | 704/275 |
| 2016/0191669 A1* | 6/2016 | Hatada | | H04L 67/34 |
| | | | | 709/220 |
| 2016/0239547 A1* | 8/2016 | Lim | | G06F 16/2358 |
| 2016/0259656 A1* | 9/2016 | Sumner | | G06F 3/04842 |
| 2016/0294839 A1* | 10/2016 | Walline | | H04W 12/088 |
| 2016/0360466 A1* | 12/2016 | Barak | | G06Q 30/01 |
| 2017/0032141 A1* | 2/2017 | Hungate | | G06F 21/6245 |
| 2017/0034286 A1* | 2/2017 | Kirschner | | H04L 67/18 |
| 2017/0124110 A1* | 5/2017 | Hajj | | H04L 67/12 |
| 2017/0173460 A1* | 6/2017 | Leu | | H04B 5/0031 |
| 2017/0244809 A1* | 8/2017 | Chae | | H04L 41/0813 |
| 2017/0251125 A1* | 8/2017 | Mull | | H04N 1/4413 |
| 2017/0308191 A1* | 10/2017 | Chung | | G06F 3/0383 |
| 2017/0311368 A1* | 10/2017 | Kan | | H04L 41/0859 |
| 2018/0018331 A1* | 1/2018 | Kesamreddy | | G06F 16/24575 |
| 2018/0114127 A1* | 4/2018 | Cole | | H04L 67/22 |
| 2018/0139592 A1* | 5/2018 | Mochizuki | | H04W 76/14 |
| 2018/0190271 A1* | 7/2018 | Bhaya | | G06F 16/3344 |
| 2018/0190277 A1* | 7/2018 | Bhaya | | G10L 15/30 |
| 2019/0028995 A1* | 1/2019 | Uchijima | | H04W 4/029 |
| 2019/0095538 A1* | 3/2019 | Narayanaswamy | | G06F 16/951 |
| 2019/0349769 A1* | 11/2019 | Palin | | G16Z 99/00 |

OTHER PUBLICATIONS

U.S. Appl. No. 62/515,977, filed Jun. 6, 2017, Context Management System for Multiple Devices and Associated Methods.

* cited by examiner

CONTEXT MANAGEMENT FOR MULTIPLE DEVICES

CROSS-REFERENCE TO RELATED APPLICATIONS

This application is a continuation of U.S. patent application Ser. No. 16/000,752 filed Jun. 5, 2018, now allowed, which is a non-provisional of and claims priority to U.S. Provisional Application No. 62/515,977, filed on Jun. 6, 2017, entitled "CONTEXT MANAGEMENT SYSTEM FOR MULTIPLE DEVICE AND ASSOCIATED METHODS," which is hereby incorporated by reference in its entirety for all purposes.

TECHNICAL FIELD

Various embodiments of the present technology generally relate to providing distributed user experiences across multiple devices. More particularly, the present technology can manage user communication(s) or interaction(s) at one of multiple devices and reference to such communication(s) or interaction(s) so as to provide context for a later user action on another of the multiple devices.

BACKGROUND

Modern technologies allow users to interact with multiple devices connected via the Internet. When a user interacts with a device, the user may refer to an item or context that was mentioned or defined in a prior communication with another device. Traditionally, the two devices do not share information or context and therefore the user needs to provide more background information when the user communicates with the later device. This is time-consuming, inconvenient, and inefficient. Therefore, it is advantageous to have an improved system that can resolve this problem.

BRIEF DESCRIPTION OF THE DRAWINGS

Embodiments of the present technology will be described and explained through the use of the accompanying drawings in which.

DETAILED DESCRIPTION

Figure 1:
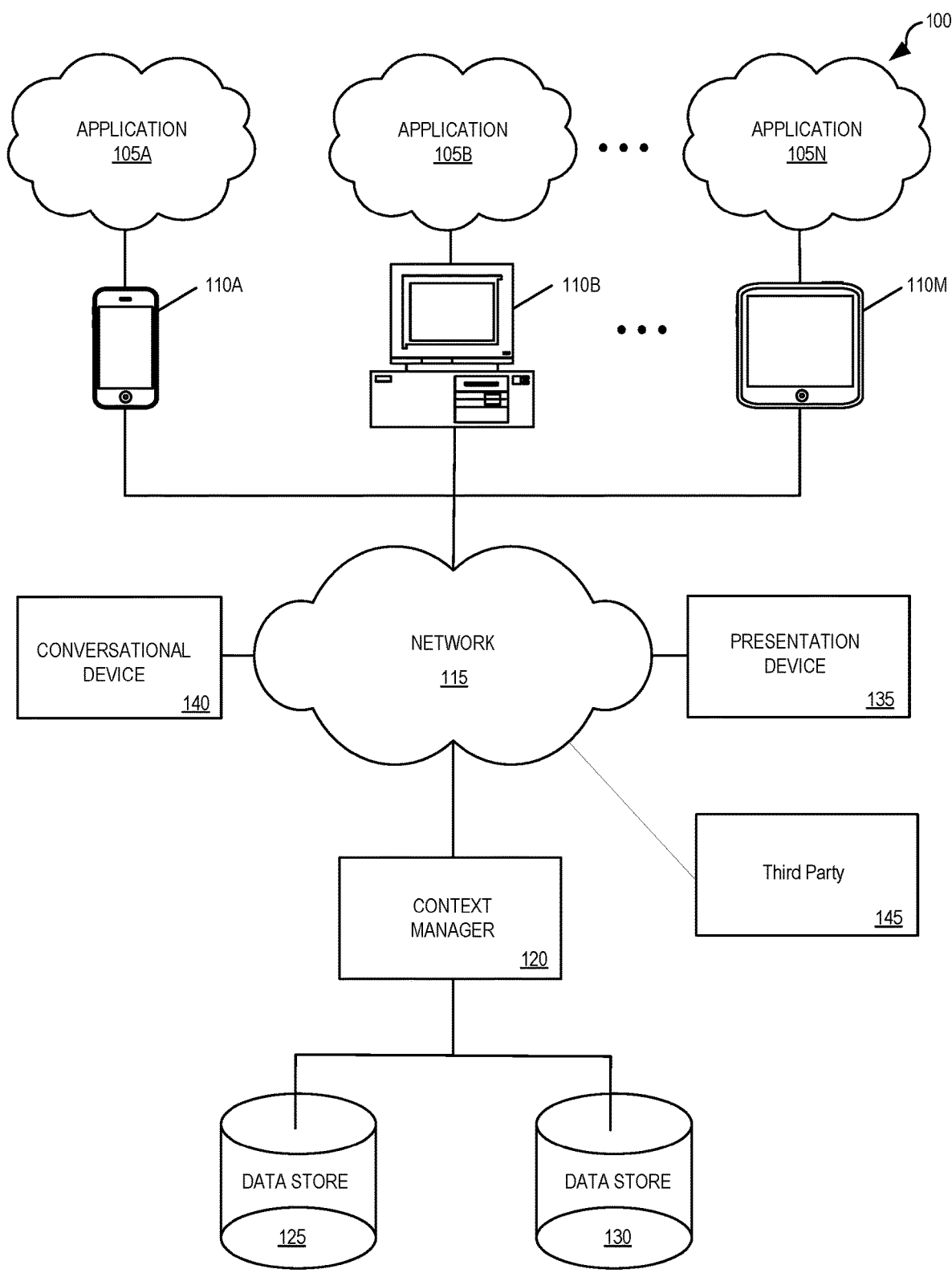
FIG. 1 illustrates an example of an operating environment in accordance with various embodiments of the present disclosure.

Various embodiments of the present technology generally relate to providing background information or context from a first device to facilitate a user's subsequent communication with a second device. For example, the user may mention a bill when the user instructs a voice-controlled device to pay the bill. Later, the user may want to show a family member that he/she actual paid the bill by displaying a relevant receipt on an Internet-connected display. The present technology enables the user to simply instruct the Internet-connected display by inputting or saying "display the receipt for the bill" or "display the receipt for the bill just paid" or the like. The present technology analyzes the user's instruction and then identifies what "the bill" in the instruction should be by performing a context analysis across all relevant devices (e.g., including the voice-controlled device, the Internet-connected display, and/or other suitable devices). In this example, after the context analysis, the present technology can determine that "the bill" referred by the user should mean the bill that was paid by user yesterday. Then the present technology can pass such determination to the Internet-connected display (as well as relevant information, such as the payment receipt for "the bill"), and then the Internet-connected display can perform the user's instruction accordingly (e.g., display the receipt).

The present technology provides a context manager configured to manage context information across multiple devices. In some embodiments, the context manager can be an application implemented in a computing device. The multiple devices can be connected via the Internet or a local network, such as, for example, a Bluetooth network, Near Field Communications, or the like. The multiple devices can be accessible to one or more users or a particular group of users (e.g., family members, company employees, etc.). The context manager can communicate with each of the multiple devices, retrieve context information therefrom, perform a context analysis, and maintain the retrieved context information.

Another aspect of the present technology includes providing a system to keep contextual information across multiple devices current and updated. In some embodiments, for example, the context manager can receive first context information indicating that a user's favorite singer is "Singer X." Later, the context manager can then receive second context information indicating that the user's favorite singer is "Singer Y." The context manager can then determine that "Singer Y" is the most updated context regarding the user's favorite singer. In other embodiments, the context manager can maintain the consistency of the context information based on various rules or in other suitable ways.

The present technology also provides a system for managing context information across multiple devices. The system can include a computing device (e.g., a server) serving as a "context manager" to manage context information (e.g., user interactions, user communications, and/or other suitable information relating to user experience) across the multiple devices. In some embodiments, each of the multiple devices can include an application configured to interact with the context manager or other devices. The context manager can communicate with the multiple devices via a network (e.g., the Internet). The context manager is configured to receive context information from the multiple devices and manage the same. The system can identify a subject-of-interest based on a user input (e.g., a voice command from a user to one of the multiple devices).

Examples of the subject-of-interest include a term/event mentioned by the user (e.g., "the bill paid yesterday," "my favorite song," "the restaurant I visited last Thursday," etc.), an unspecified action item ("buy" a ticket without specifying where to "buy," "pay" my uncle without saying how to pay, "show" me the balance of my bank account without designating a location to display, etc.), and/or other suitable subject. Once the subject-of-interest is identified, the system can then determine a set of relevant context information from the received and/or maintained context information. For example, the system can determine the context information related to the subject-of interest by analyzing the received context information. The system can then transmit the relevant context information to a device that needs such information to perform a task based on the user input.

For example, the user input can be a voice command "show me the bill paid yesterday on TV." In this embodiment, a voice-controlled device can parse the voice command and then determine that it needs more context information to "understand" the user input. The voice-controlled device identifies that a subject-of-interest is "the bill paid yesterday" and requests relevant context information from the context manager. The context manager can learn what "the bill paid yesterday" is by accessing to the user's mobile device which was used to pay a utility bill yesterday (in other embodiments, the context manager can access its local copy of the context information from the user's mobile device). In other words, the context manager may poll the applicable devices to determine what device paid a bill yesterday. Once the device is identified, the context manager may poll or pull the information about the bill paid yesterday. Alternatively, the device may push the information regarding the context of to the context manager. The context manager can then transmit such context information to the voice-controlled device. The voice-controlled device can ask a presentation device (e.g., an Internet television) in the same network to display the paid bill. In some embodiments, the context manager can communicate with the presentation device directly and ask it to perform the task as the user requested.

By this arrangement, the present technology can provide a user with improved user experience. For example, when a user interacts with one device, the device (e.g., via the context manager) can have access to the user's prior communication or interaction with other devices in the same network. Therefore, the device "knows" what happened before and can communicate with the user with such knowledge. As a result, it is convenient to the user when communicating with the multiple devices without providing details or background information for every user input.

In some embodiments, each of the multiple devices can manage a copy of the most current context information (e.g., which can be downloaded from the context manager). In such embodiments, the individual devices can perform a search in their local copies, so as to identify the set of relevant context information. In some embodiments, the context manager can actively manage the context information across the multiple devices by constantly or periodically checking with the multiple devices for updates. In other embodiments, the context manager can passively manage the context information across the multiple devices by constantly or periodically receiving updates from the multiple devices. In some embodiments, the present technology enables multiple users to access the context information at the same time. In certain embodiments of the technology, the context manager and multiple devices may share context information using web socket protocols.

The present technology provides a method for managing context information across multiple devices accessible via a network. Various embodiments may provide one or more of the following technological improvements: (1) improved efficiency in communication between a user and the multiple devices by effectively managing context information from the multiple devices; (2) improved user experience by enabling a user to control the multiple devices with shorter commands or ambiguous instructions; and (3) keeping the multiple devices in sync regarding the user's communication and interactions with the multiple devices. Advantages of the present technology also include that if one of the mobile device (or the context manager) is temporarily offline, the context information will still be handled locally. Once the mobile device is back online, the locally-handled context information can be in sync with other devices.

FIG. 1 illustrates an example of a network-based operating environment 100 in which some embodiments of the present disclosure may be used. As illustrated in FIG. 1, the operating environment 100 includes applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, the applications 105A-105N may be stored on the computing devices 110A-110M or may be stored remotely on a server (in the "cloud"). The computing devices 110A-110M can include mechanisms for receiving a user input and sending the same by connecting through a network 115 to a context manager 120 (e.g., a server, a computing device, an application, etc.) and data stores 125 and 130.

The operating environment 100 also includes a presentation device 135 (e.g., an Internet television such as an APPLE TV® or an Android TV®) and a conversational device 140 (e.g., a voice-controlled device such as Amazon Alexa®, Google Home®, a Cortana® application on a device, or an iPhone® with Siri® application). In some embodiments, the conversational device 140 and the presentation device 135 can also include applications installed to interact with other devices in the operating environment 100. While shown as separate, the presentation device 135 and the conversational device 140 may be integrated into a single device. Also, in certain embodiments, the presentation device 135 and/or the conversational device 140 may be integrated into one or more of the computing devices 110A-110M.

The computing devices 110A-110M, the presentation device 135, and the conversational device 140 are configured to communicate via the network 115 with the context manager 120. In some embodiments, the computing devices 110A-110M can retrieve from or submit information to the context manager 120 and the data stores 125 and 130. In some embodiments, the computing devices 110A-110M can run one or more customized applications to interact with the context manager 120 and the data stores 125 and 130. For example, the computing devices 110A-110M can execute a browser application or a customized client application to enable interaction between the computing devices 110A-110M, the context manager 120, and data stores 125 and 130. In some embodiments, the presentation device 135 and the conversational device 140 can communicate with the context manager 120 and the data stores 125 and 130 in the ways similar to those described above with reference to the computing devices 110A-110M.

The network 115 can be any combination of local area and/or wide area networks using wired and/or wireless communication systems. The network 115 can use one or more following protocols/technologies: Ethernet, IEEE 802.11 or Wi-Fi, worldwide interoperability for microwave access (WiMAX), cellular telecommunication (e.g., 3G, 4G, or 5G), CDMA, cable, digital subscriber line (DSL), etc. Similarly, the networking protocols used on the network 115 can include multiprotocol label switching (MPLS), transmission control protocol/Internet protocol (TCP/IP), user datagram protocol (UDP), hypertext transport protocol (HTTP), simple mail transfer protocol (SMTP) and file transfer protocol (FTP). Data exchanged over the network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol Security (IPsec).

The context manager 120 can manage the received context information and keep it consistent and updated. For example, in some embodiments, the context manager 120 can track when each piece of context information is generated and then determine which context information is most up-to-date. For example, when a user input refers to a "paid bill," the context manager 120 can identify multiple pieces of context information (e.g., a first bill paid one year ago, a second bill paid one month ago, and a third bill paid yesterday) and then select a suitable one to move forward based on predetermined rules (e.g., selecting the third bill paid yesterday because the rule is choosing the most recent one). In other embodiments, the context manager 120 can manage and/or analyze the received context information in various suitable ways (e.g., ranking, weighting, categorizing, grouping, etc.)

In some embodiments, the context manager 120 can run on one or more computing devices, such as one or more servers, and is configured to receive context information from the computing devices 110A-110M, the presentation device 135, and the conversational device 140. In some embodiments, the context manager 120 can be a computing device, such as a server. In other embodiments, the context manager 120 can be an application implemented on a computing device. In some embodiments, the context manager 120 can be implemented as a computing device or a server. In some embodiments, the context manager 120 can be stored in a distributed file system. In some embodiments, the context manager 120 can be stored in a distributed filing system. In some embodiments, the context manager 120 can be stored in a cloud filing system.

When a user input is received by a device (e.g., the computing devices 110A-110M, the presentation device 135, or the conversational device 140), the user input is then analyzed or parsed to determine whether there is any subject-of-interest requiring further context information. If so, the device transmits the identified subject-of-interest to the context manager 120 for further process. The context manager 120 can then generate a set of relevant context information based on the identified subject-of-interest and the received/managed context information. For example, the context manager 120 can perform a search in the received or managed context information, using the identified subject-of-interest (or a term relevant thereto) as a keyword. Once the set of relevant context information is generated, it is transmitted back to the device (or to another device connected via the network 115, depending on the task to be performed) for further process. In other embodiments, the device that receives the user input can perform a search in the context information received/managed by the context manager 120. In some embodiments, the device that receives the user input can perform a search in a local copy of the context information received/managed by the context manager 120.

With the set of relevant context information, the device that receives the user input (or another suitable device connected via the network 115) can then perform the task requested by the user without asking the user to provide more information or details. Accordingly, the present technology provides a convenient, easy-to-user, and efficient way for a user to interact with multiple devices connected via a network and therefore enhances overall user experience. One useful example of the technology of the present application relates to music. In this example, a user may be searching for music by the Eagles on a connected tablet computing device while at work. The user, on returning home, may say to Alexa®: "Play music by them." Alexa® will recognize the play music command, but will not necessarily recognize "them." Thus, Alexa® may request that the context manager 120 determine what "them" means in this context. The context manager 120 would return "the Eagles" and Alexa® would interpret the request as "Play music by [the Eagles]" where the context of the request is provided across multiple devices.

As shown in FIG. 1, the context manager 120 can be coupled to the data stores 125 and 130. The data stores 125 and 130 can be used to store context information received and/or managed by the context manager 120. In some embodiments, the context information can include user profiles, user preferences, prior user transactions, user activities (e.g., a click trail of previous 1000 clicks in an app), user registered devices, user account information, information relating to the registered devices (e.g., when a device is registered, whether a mobile application is downloaded on the device, networks the device connects to, etc.), location information, security questions and answers, and/or other suitable information. The relevant context information may be established such that if the user states: "what is my savings balance," the context understands what bank and what account at that bank, for example, even if the user has not recently engaged in any on-line banking activity. The data stores 125 and 130 can be data repositories of a set of integrated objects that are modeled using classes defined in database schemas. The context manager 120 and/or other devices can collect and/or access data from the data stores 125 and 130. In some embodiments, the data stores 125 and 130 can be used to store different types of user data or information (e.g., different types of context information).

In some embodiments, the context manager 120 can grant access to a third party 145 for accessing the received context information. In such embodiments, the third party 145 can perform the functions similar to those of the device (e.g., the computing devices 110A-110M, the presentation device 135, or the conversational device 140) discussed above. In some embodiments, the third party 145 can also collect context information and provide the same to the context manager 120.

Figure 2:
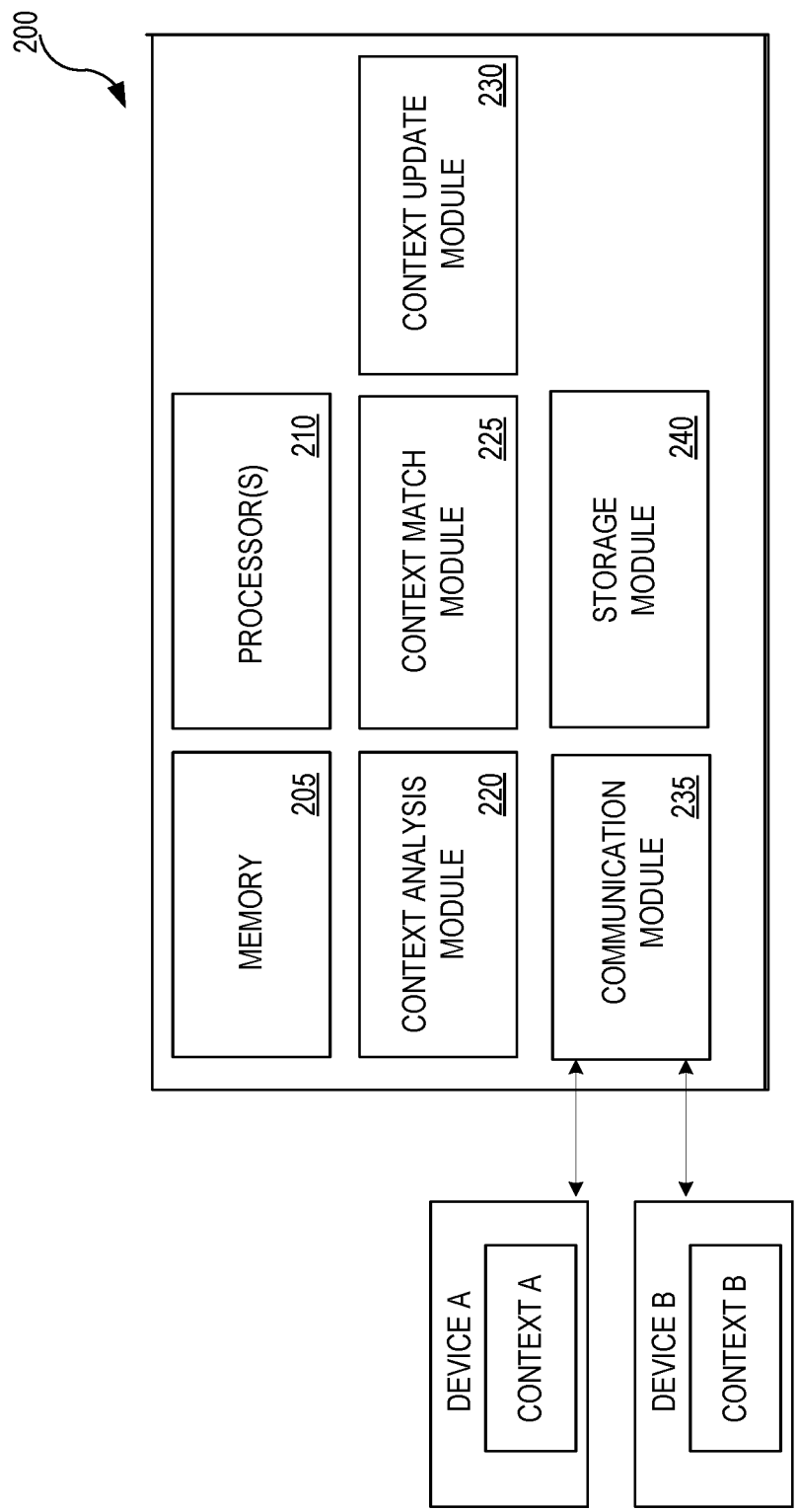
FIG. 2 illustrates an example of a block diagram of a context manager in accordance with various embodiments of the present disclosure.

FIG. 2 illustrates an example of a block diagram of a context manager 200 in accordance with various embodiments of the present disclosure. As shown, the context manager 200 can include a memory 205, one or more processors 210, a context analysis module 220, a context matching module 225, a context update module 230, a communication module 235, and a storage module 240.

In some embodiments, the memory 205 can store instructions for running one or more applications or modules on processor(s) 210. For example, the memory 205 could be used in one or more embodiments to house all or some of the instructions needed to execute the functionality of context manager 200. The memory 205 can include any device, mechanism, or populated data structure used for storing information. In accordance with some embodiments of the present disclosure, the memory 205 can encompass, but is not limited to, any type of volatile memory, nonvolatile memory (RAM), and dynamic memory. For example, the memory 205 can be a random access memory, memory storage devices, optical memory devices, magnetic media, floppy disks, magnetic tapes, hard drives, single in-line memory modules (SIMMs), synchronous dynamic random access memory (SDRAM), dual in-line memory modules (DIMMs), Rambus dynamic random access memory (RDRAM), double data rate RAM (DDR RAM), small outline DIMMs (SODIMMs), EPROMs, EEPROMs, compact discs, DVDs, and/or the like. In accordance with some embodiments, the memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as the memory 205.

In some embodiments, the context analysis module 220 is configured to identify a subject-of-interest in a user input. Examples of the subject-of-interest include an undefined or ambiguous term in the user input, an uncertain action, and/or other suitable subject. In some embodiments, the subject-of-interest can be identified by a sematic analysis. In some embodiments, the subject-of-interest can be identified by comparing the user input with a list of predefined instructions or commands (e.g., if a term in the user input does not have a corresponding match in the list, then determine that the term is a subject-of-interest that requires further process). In some embodiments, the subject-of-interest can be identified by a device that receives the user input (e.g., the computing devices 110A-110M, the presentation device 135, or the conversational device 140).

Once the subject-of-interest is identified, the context match module 225 can then identify a set of relevant context information from an internal context information source (e.g., context information stored in the storage module 240) and/or an external context information source (e.g., context A from device A or context B from device B). In the illustrated embodiments, the external context information source can be accessed via the communication module 235. In some embodiments, the context match module 225 can perform a search (e.g., a keyword search) in the context information sources. Based on the search result, a set of relevant context information can be generated and transmitted to a suitable device to perform the task mentioned in the user input. For example, the subject-of-interest can be the way to make a payment. In such embodiments, the search result may indicate that the user always uses his credit card to pay bills via an online payment service provider. In such case, the set of relevant context information can be making the payment via the online payment service provider (e.g., including the user's profile, preferences, credit card information, etc.). The relevant context information is then transmitted to the user's smartphone (e.g., which receives the user input and is capable of performing the payment task) for further process (e.g., make the payment).

In some embodiments, the context update module 230 can be configured to manage all the context information resources associated with the context manager 200. For example, the context update module 230 can keep tracking when a certain piece of context information is generated, and/or by which device that context information is generated. By so doing, the context update module 230 can verify whether the context information is most up-to-date. In some embodiments, the context update module 230 can maintain the data quality (e.g., integrity or consistency) of the context information resources by other suitable ways.

The communication module 235 facilitates communication (e.g., in the form of voice, text, data, and/or other suitable formats) with other devices via various communication methods via the network 115, such as cellular communication, near field communication (NFC), Bluetooth, and Wi-Fi. In other embodiments, the communication module 235 can support wired communication methods.

Figure 3:
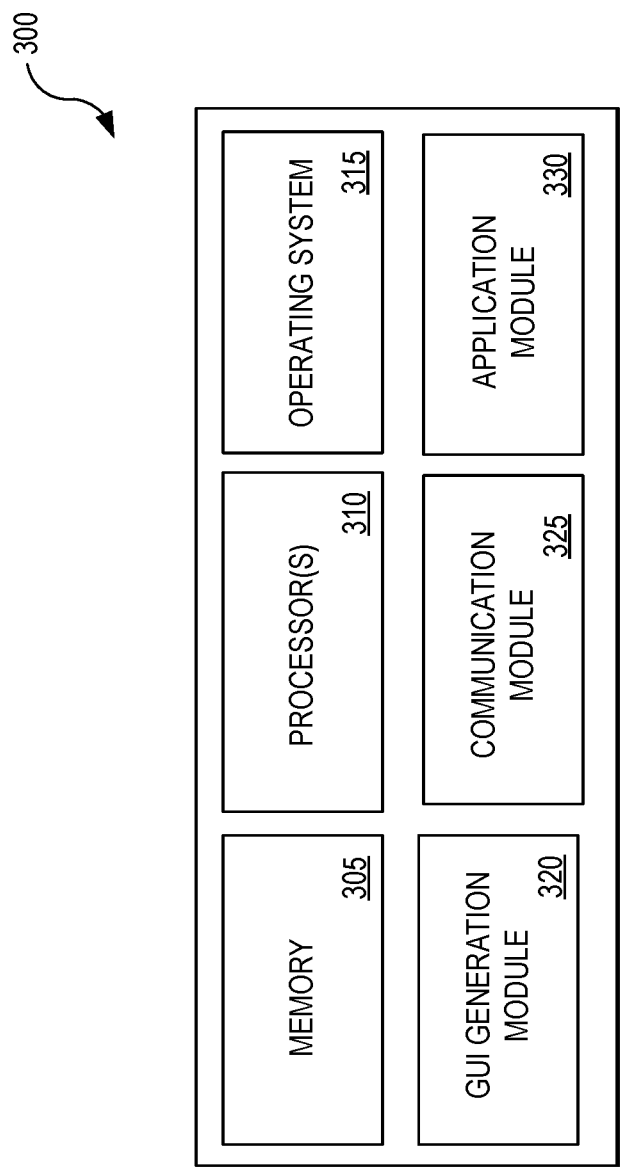
FIG. 3 illustrates an example of a block diagram of a computing device.

FIG. 3 illustrates a set of components within a user's computing device 300 (e.g., the computing device 110A-110M, the presentation device 135, or the conversational device 140) according to one or more embodiments of the present disclosure. The computing device 300 can communicate with a context manager (e.g., the context manager 120 or 200). As shown in FIG. 3, the computing device 300 can include a memory 305, one or more processors 310, an operating system 315, a GUI generation module 320, a communication module 325, and an application 330 (e.g., for communicating with the context manager). Other embodiments of the present technology can include some, all, or none of these modules and components, along with other modules, applications, and/or components. Still yet, some embodiments can incorporate two or more of these modules and components into a single module and/or associate a portion of the functionality of one or more of these modules with a different module.

In some embodiments, the memory 305 can store instructions for running one or more applications or modules on processor(s) 310. The operating system 315 can provide a software package that is capable of managing the hardware resources of the computing device 300. The operating system 315 can also provide common services for software applications running on processor(s) 310. In accordance with various embodiments, the operating system 315 can coordinate resources for multiple applications 330 that enable a user to access and interact with the context manager. For example, the application 330 can include an application for requesting context information from, or performing a search in, a database (e.g., the data stores 125, 130) or the context manager.

The GUI generation module 320 can generate one or more graphical user interface (GUI) screens that allow for interaction with a user. In some embodiments, the GUI generation module 320 can generate a GUI for receiving and/or conveying information (e.g., information relating to context information and user inputs) to the user's computing device. The GUI generation module 320 on a user's computing device can display a GUI providing data and including one or more embedded triggers that detect the user interaction.

The communication module 325 is configured to communicate (e.g., in the form of voice, text, data, and/or other suitable formats) with other devices, servers, or the context manager 120 via various communication methods (e.g., cellular communication, near field communication (NFC), Bluetooth, Wi-Fi, or other wired communication). In some embodiments, the communication module 325 can receive and/or transmit session-specific codes from/to the context manager 120 when a user intends to request context information. In some embodiments, the communication module 325 can simultaneously maintain voice/data communications over different channels. The application 230 can be configured to communicate with the context manager. In some embodiments, the application 230 can access the context manager to retrieve context information or perform certain operation by sending user inputs or subject-of-interest.

Figure 4:
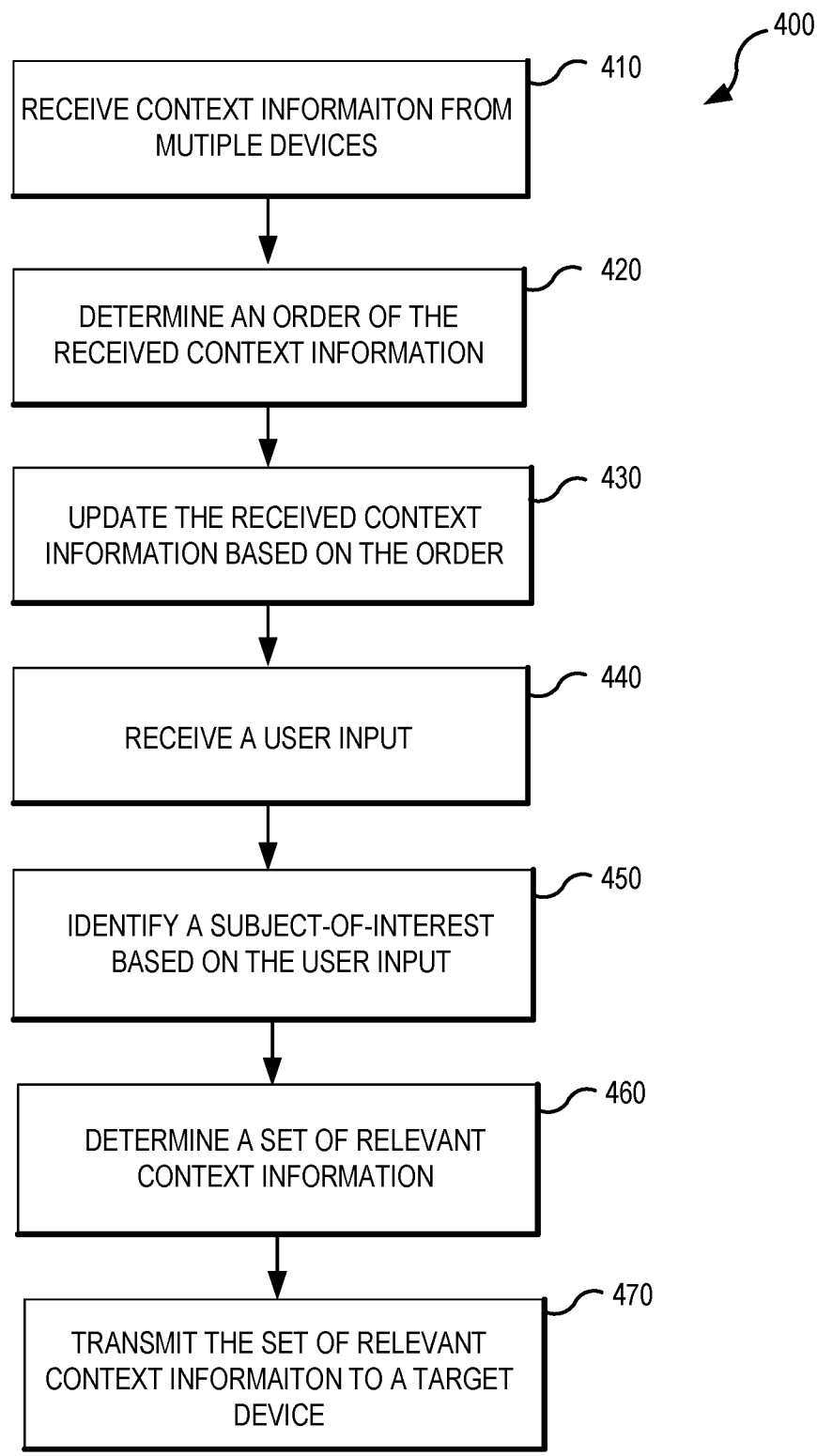
FIG. 4 illustrates an example of a flowchart in accordance with various embodiments of the present disclosure.

FIG. 4 illustrates an example of a flowchart in accordance with various embodiments of the present disclosure. Method 400 can be implemented by a context managing device (e.g., the context manager 120 or 200). At block 410, the context managing device receives context information from multiple devices connected in a network. At block 420, the context managing device then determines an order associated with the received context information. The context managing device then updates the received context information based on the order at block 430. The method 400 then proceeds to block 440 by receiving a user input. At block 450, the context managing device then identifies a subject-of-interest based on the user input. At block 460, a set of relevant context information is determined based on analyzing the subject-of-interest and the received context information. At block 470, the context managing device then transmits the set of relevant context information to a target device for further process.

Computer System Overview

Figure 5:
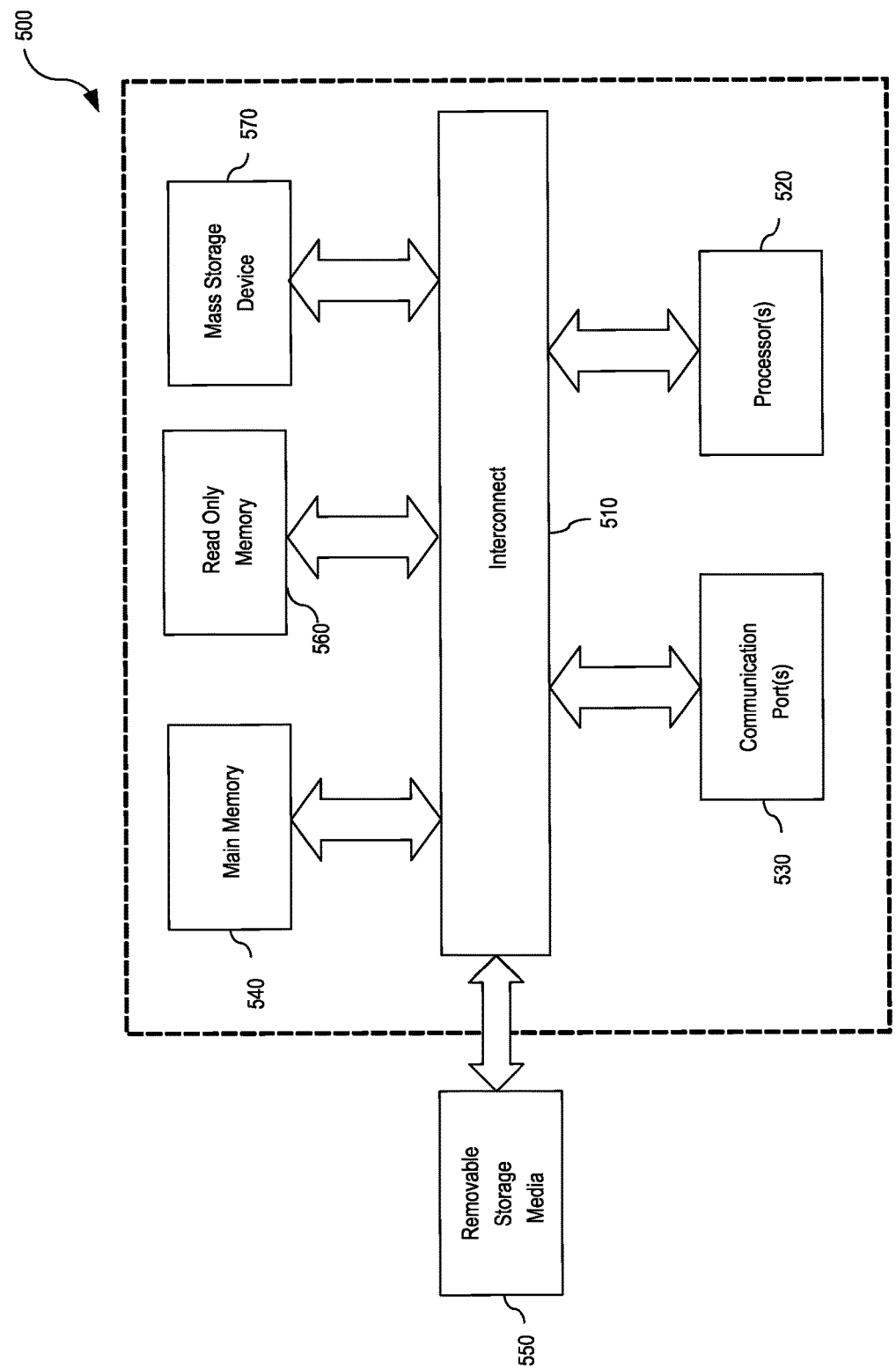
FIG. 5 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present disclosure may be utilized. According to the present example, the computer system 500 includes an interconnect 510, at least one processor 520, at least one communication port 530, a main memory 540, a removable storage media 550, a read-only memory 560, and a mass storage device 570.

The processor 520 can be any known processor, such as, but not limited to, an Intel® Itanium® or Itanium 2® processor(s), or AMD Opteron® or Athlon MP® processor(s), or Motorola® lines of processors. The communication port 530 can be a RS-232 port for use with a modem-based dial-up connection, a 10/100 Ethernet port, or a Gigabit port using copper or fiber. The communication port 530 may be chosen depending on the type of network such as a Local Area Network (LAN), Wide Area Network (WAN), or any network to which the computer system 1200 connects. The main memory 540 can be random access memory (RAM) or any other dynamic storage device(s) commonly known in the art. Read-only memory 560 can be any static storage device(s) such as programmable read-only memory (PROM) chips for storing static information, such as instructions for processor(s) 520.

The mass storage device 570 can be used to store information and instructions. Examples of the mass storage device 570 include hard disks such as the Adaptec® family of SCSI (small computer system interface) drives, optical discs, an array of discs such as RAID (redundant array of independent disks), the Adaptec® family of RAID drives, or any other mass storage device. The interconnect 510 communicatively couples the processor 520 with the other memory, storage, and communication blocks. Depending on the storage devices used, the interconnect 510 can be a PCI/PCI-X- or SCSI-based system bus. The removable storage media 550 can be any type of external hard drive, floppy drive, IOMEGA® Zip Drives, compact disc read-only memory (CD-ROM), compact disc re-writable (CD-RW), and/or digital video disc read-only memory (DVD-ROM). The components described above are meant to exemplify some types of possibilities. In no way should the aforementioned examples limit the disclosure, as they are only exemplary embodiments.

For purposes of explanation and illustration, the term "application" can refer to software, instructions, and/or other suitable programed operations or routines. The application can run on various kinds of device (e.g., a server, a mobile device, a desktop computer, a laptop computer, a voice-controlled device, a display device, etc.). In the above description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of medium/machine-readable medium suitable for storing electronic instructions.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may" or "can" be included or have a characteristic, that particular component or feature is not required to be included or have the characteristic. The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

What is claimed is:

1. A computing system for managing context information across multiple devices, the computing system comprising:
    one or more processors; and
    one or more memories storing instructions that, when executed by the one or more processors, cause the computing system to perform a process comprising:
        receiving, from a first device among the multiple devices, a request for information, wherein the request includes first context information, and wherein the multiple devices are registered to a single user;
        causing a context analysis to be performed across the multiple devices associated with the registered single user to determine a second device, of the multiple devices associated with the registered single user, to provide second context information,
            wherein the second device is determined based on previous interactions between at least two of the multiple devices associated with the registered single user, and
            wherein the second context information is determined based on the first context information and a most recent time the second context information was generated;
        receiving, from the second device, the second context information;
        determining a set of result information based at least in part on the second context information, wherein the set of result information includes context information related to the first context information; and
        causing the set of result information to be displayed on a target device.

2. The computing system of claim 1, wherein the process further comprises:
    determining, for each of the multiple devices associated with the registered single user, time information regarding when the received context information is generated; and
    updating the received context information based on the determined time information for each of the multiple devices associated with the registered single user.

3. The computing system of claim 1, wherein the first device includes a voice-controlled device, and wherein the request includes a voice command.

4. The computing system of claim 1, wherein the first device includes a portable computing device, and wherein the first device includes an information storage module configured to store the first context information of the first device.

5. The computing system of claim 1, wherein the process further comprises:
    causing information associated with the set of result information to be displayed on the second device.

6. The computing system of claim 1, wherein the process further comprises:
    parsing the request to identify a subject-of-interest based at least in part on the first context information.

7. The computing system of claim 1, wherein the set of result information is further based on a search in the received second context information using a keyword associated with a subject-of-interest.

8. The computing system of claim 1, wherein the determining the set of result information further comprises searching in a database coupled to a computing device using a keyword associated with a subject-of-interest.

9. The computing system of claim 1, wherein the process further comprises:
    causing third context information to be received from a third device, wherein the third context information is determined based on the first context information; and
    updating the set of result information based at least on the third context information, when the second context information is generated prior to the third context information.

10. A non-transitory computer-readable storage medium storing instructions that, when executed by a computing system, cause the computing system to perform a process for managing context information across multiple devices, the process comprising:
    receiving, at a server from a first device among the multiple devices, a request for information, wherein the request includes first context information, and wherein the multiple devices are registered to a single user;
    causing a context analysis to be performed across the multiple devices associated with the registered single user to determine a second device, of the multiple devices associated with the registered single user, to provide second context information,
        wherein the second device is determined based on previous interactions between at least two of the multiple devices associated with the registered single user, and
        wherein the second context information is determined based on the first context information and a most recent time the second context information was generated;
    receiving, from the second device, the second context information;

determining a set of result information based at least in part on the second context information, wherein the set of result information includes context information related to the first context information; and causing the set of result information to be displayed on a target device.

11. The non-transitory computer-readable storage medium of claim 10, wherein the process further comprises:

causing the computing system to receive, from a third device, third context information, wherein the third context information is determined based on the first context information.

12. The non-transitory computer-readable storage medium of claim 11, wherein the process further comprises:

causing the computing system to determine whether the second context information is generated prior to the third context information.

13. The non-transitory computer-readable storage medium of claim 12, wherein the process further comprises:

causing the computing system to determine the set of result information based at least in part on the third context information, when the second context information is generated prior to the third context information.

14. The non-transitory computer-readable storage medium of claim 10, wherein the process further comprises:

causing the computing system to determine the set of result information based on a search using a keyword associated with a subject-of-interest.

15. A method of managing context information across multiple devices accessible via a network, the method comprising:

receiving, at a server from a first device among the multiple devices, a request for information, wherein the request includes first context information, and wherein the multiple devices are registered to a single user;

causing a context analysis to be performed across the multiple devices associated with the registered single user to determine a second device, of the multiple devices associated with the registered single user, to provide second context information, wherein the second device is determined based on previous interactions between at least two of the multiple devices associated with the registered single user, and wherein the second context information is determined based on the first context information and a most recent time the second context information was generated;

receiving, from the second device, the second context information;

determining a set of result information based at least in part on the second context information, wherein the set of result information includes context information related to the first context information; and causing the set of result information to be displayed on a target device.

16. The method of claim 15, further comprising:

identifying a subject-of-interest by parsing the request for the first context information to generate one or more candidates.

17. The method of claim 16, further comprising, selecting the subject-of-interest from the one or more candidates.

18. The method of claim 15, wherein the multiple devices associated with the registered single user include a voice-controlled device.

19. The method of claim 15, wherein the multiple devices associated with the registered single user include a portable computing device.

20. The method of claim 15, further comprising:

causing information associated with the set of result information to be displayed on the second device or on another one of the multiple devices registered to the single user.

* * * * *